United States Patent
Morrey et al.

(10) Patent No.: US 9,607,086 B2
(45) Date of Patent: Mar. 28, 2017

(54) PROVIDING PREVALENCE INFORMATION USING QUERY DATA

(71) Applicant: McAfee, Inc., Santa Clara, CA (US)

(72) Inventors: Richard Morrey, Santa Clara, CA (US); Guy Roberts, Bletchley (GB); Ramnath Venugopalan, Webster, NY (US); Nick Wilson, Santa Clara, CA (US)

(73) Assignee: McAfee, Inc., Santa Clara, CA (US)

( * ) Notice: Subject to any disclaimer, the term of this patent is extended or adjusted under 35 U.S.C. 154(b) by 197 days.

(21) Appl. No.: 14/227,201

(22) Filed: Mar. 27, 2014

(65) Prior Publication Data
US 2015/0278354 A1 Oct. 1, 2015

(51) Int. Cl.
*G06F 17/30* (2006.01)

(52) U.S. Cl.
CPC .. *G06F 17/30864* (2013.01); *G06F 17/30539* (2013.01)

(58) Field of Classification Search
USPC .................................................. 707/723, 747
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 7,720,720 B1 * | 5/2010 | Sharma ................. | G06Q 30/02 705/26.7 |
| 8,244,817 B2 | 8/2012 | Kay | |
| 8,423,791 B1 | 4/2013 | Yu et al. | |
| 8,549,581 B1 | 10/2013 | Kailash et al. | |
| 8,554,742 B2 * | 10/2013 | Naeymi-Rad .......... | G06N 7/005 707/692 |
| 2003/0014403 A1 * | 1/2003 | Chandrasekar ..... | G06F 17/3064 |
| 2005/0050033 A1 * | 3/2005 | Thomas ............ | G06F 17/30483 |
| 2006/0122991 A1 * | 6/2006 | Chandrasekar ..... | G06F 17/3064 |
| 2010/0042610 A1 * | 2/2010 | Lakhani ............ | G06F 17/30699 707/708 |
| 2011/0067101 A1 | 3/2011 | Seshadri et al. | |
| 2013/0144871 A1 * | 6/2013 | Xia ................... | G06F 17/30817 707/727 |
| 2013/0254880 A1 | 9/2013 | Alperovitch et al. | |
| 2015/0161207 A1 * | 6/2015 | Li ....................... | G06F 17/3033 707/747 |

FOREIGN PATENT DOCUMENTS

WO WO 2015/148056 A1 10/2015

OTHER PUBLICATIONS

International Search Report and Written Opinion In International Application No. PCT/US2015/018201, mailed on May 26, 2015, 8 pages.

* cited by examiner

*Primary Examiner* — Cam-Linh Nguyen
(74) *Attorney, Agent, or Firm* — Patent Capital Group

(57) ABSTRACT

In one example, a data security system may determine prevalence of a file based query data for an object (e.g., a file or a hash or a file). An example algorithm may provide using a statistically justifiable estimate of the prevalence while storing few data records, and therefore may provide prevalence information in O(1) time complexity (i.e., constant time). Such an algorithm may be applied in near real-time to provide, e.g., an immediate response to a query for the prevalence of a file.

16 Claims, 8 Drawing Sheets

| n_max | OOM | Prob | OOM+-1 Prob |
|---|---|---|---|
| <5 | 1 - 10 | 0.4 | 1 |
| 5 | 10 - 100 | 0.74 | 1 |
| 9 | 100 - 1,000 | 0.69 | 0.98 |
| 12 | 1,000 - 10,000 | 0.70 | 0.98 |
| 15 | 10,000 - 100,000 | 0.69 | 0.97 |
| 19 | 100,000 - 1,000,000 | 0.68 | 0.98 |
| ⋮ | ⋮ | ⋮ | ⋮ |
| n_max=x | $10^{z-1}$-$10^z$ | $\Delta[P(10^{z-1}|n\_max=x), P(10^z|n\_max=x)]$ | $\Delta[P(10^{z-2}|n\_max=x), P(10^{z+1}|n\_max=x)]$ |

FIG. 5

| INDEX | $i_1$ | $i_2$ | $i_3$ | $i_4$ | $i_5$ | $i_6$ | $i_7$ | $i_8$ | ∘∘∘ | $i_N$ |
|---|---|---|---|---|---|---|---|---|---|---|
| DEVICE 1 | 0 | 1 | 1 | 0 | 1 | 0 | 0 | 0 | ∘∘∘ | _ |
| DEVICE 2 | 0 | 0 | 1 | 0 | 1 | 0 | 1 | 1 | ∘∘∘ | _ |
| DEVICE 3 | 0 | 1 | 1 | 0 | 1 | 0 | 1 | 0 | ∘∘∘ | _ |

FIG. 7

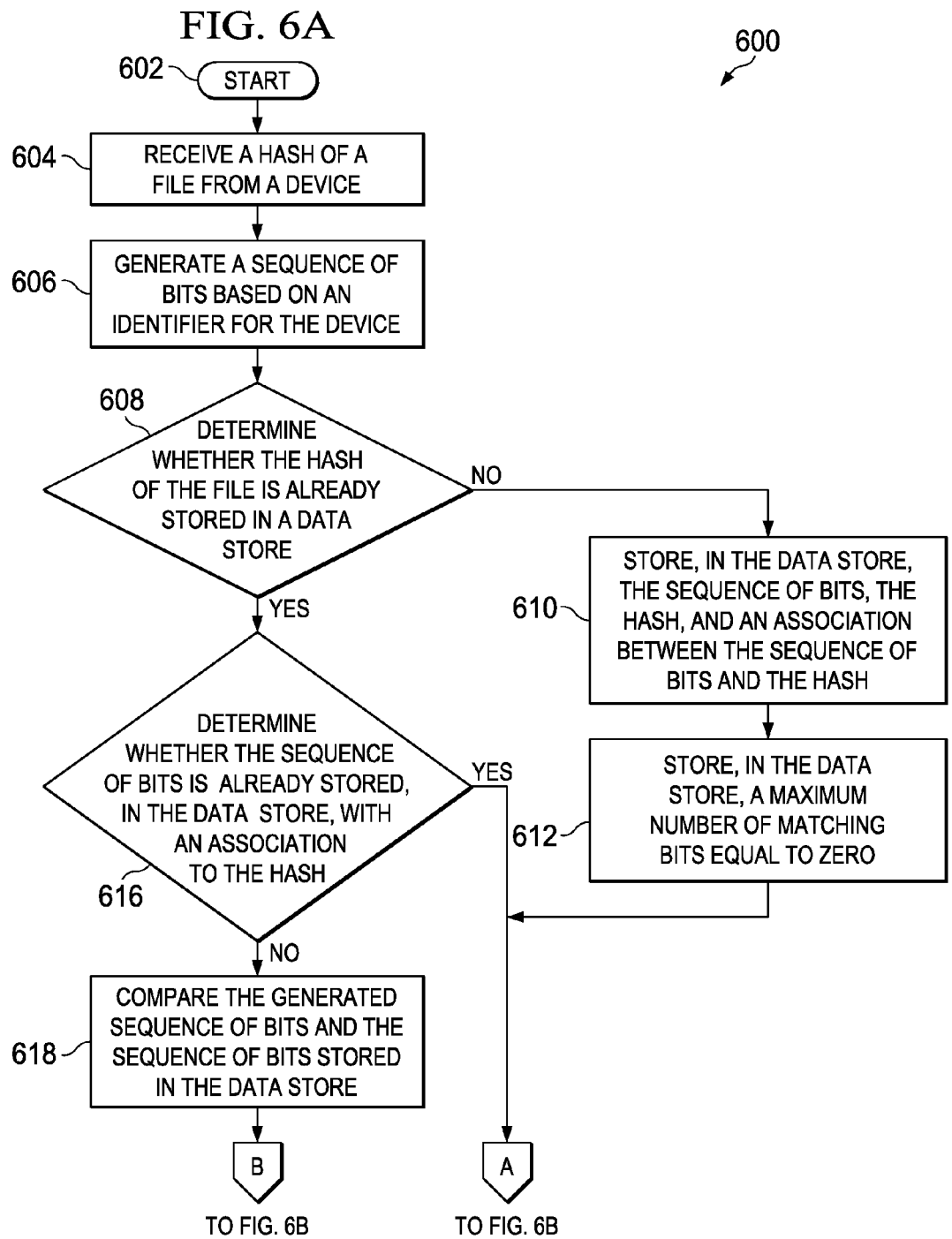

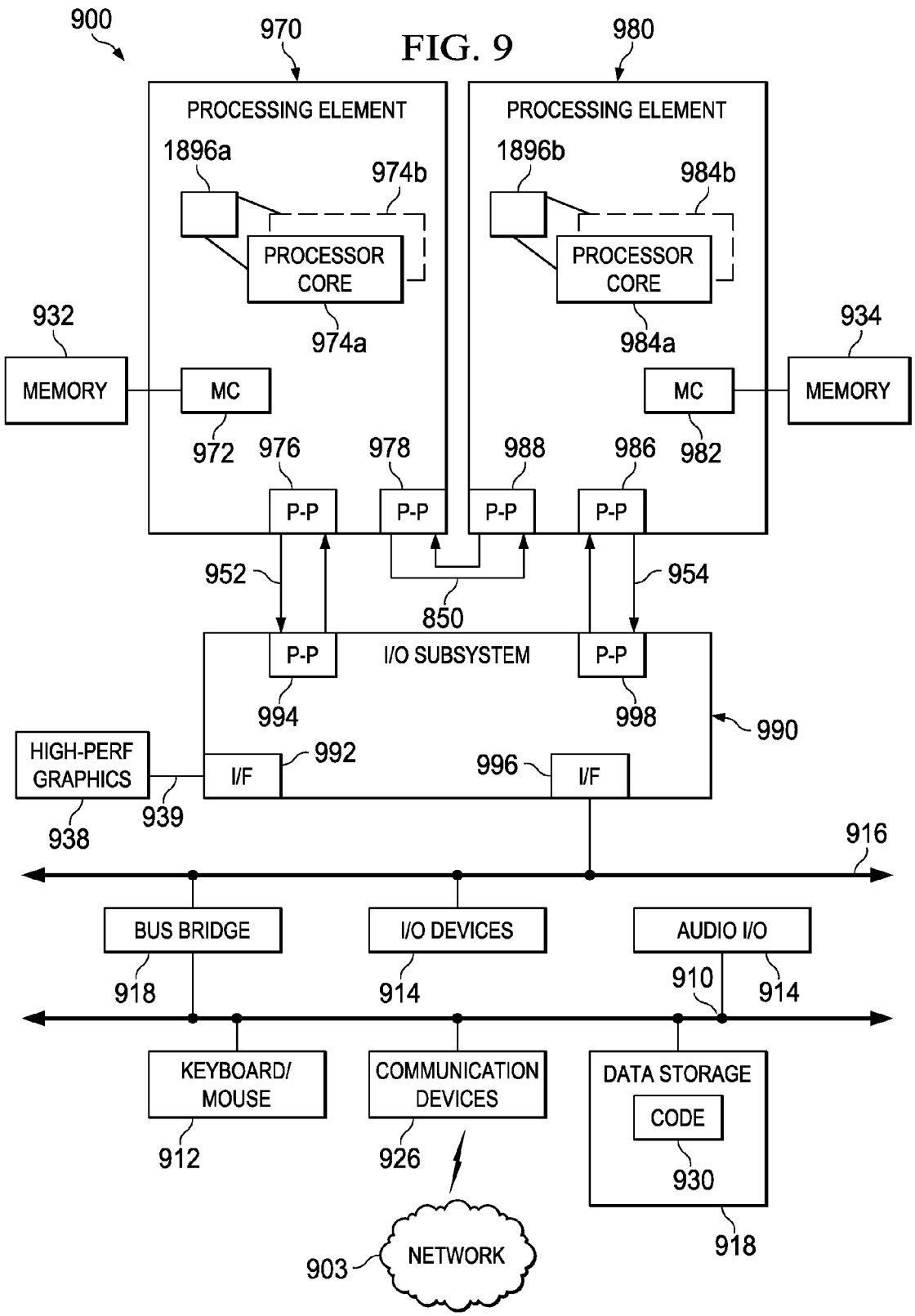

US 9,607,086 B2

PROVIDING PREVALENCE INFORMATION USING QUERY DATA

TECHNICAL FIELD

Embodiments described generally relate to the field of computer security, and more particularly to providing prevalence information using query data.

BACKGROUND

Modern computing technology may provide the ability to maintain large amounts of data on across globally distributed resources. Certain distributed architectures allow the ability to respond to requests to identify trends in large distributed data sets (e.g., financial market analysts, tracking medical epidemics, data security systems, etc.). Processing such data is challenging. A data security system, for example, may analyze distributed data to identify security threats and provide up-to-date security information to various endpoints, each of which may located remote from the system.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 5 is a chart showing an exemplary correspondence, based on probabilities, between a number of matching values and prevalence information.

FIGS. 6A and 6B depict a flow chart illustrating logic for providing prevalence information for a hash of a file according to one or more embodiments of the present specification.

FIG. 7 illustrates three exemplary sequences of bits corresponding to three devices, according to an embodiment of the present specification.

FIG. 9 is a block diagram of an example computing system that is arranged in a point-to-point (PtP) configuration according to an embodiment.

DESCRIPTION OF EMBODIMENTS

Figure 1:
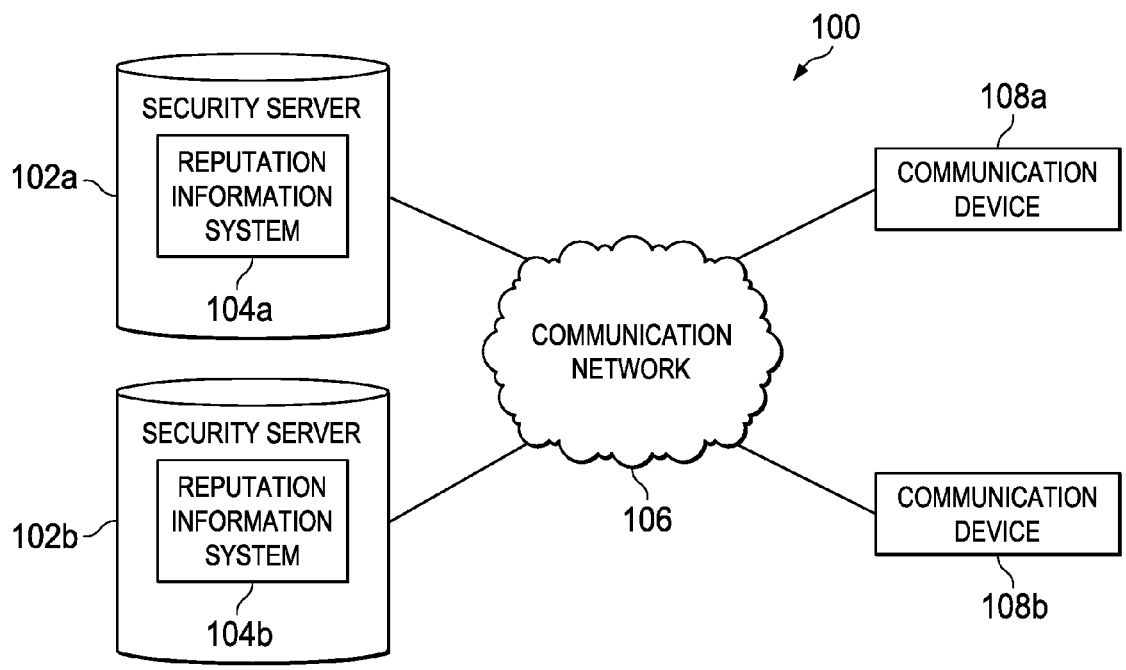
FIG. 1 is component diagram illustrating an exemplary system for providing data security information comprising reputation information, according to one or more embodiments of the present specification.

Providing data security often requires processing a large amount of data. A system that provides data security information may receive a plurality of queries (e.g., millions or billions in a 30 day time period) for security information related to one or more objects. An object may be a file, a hash value, a hash of a file, or any other data object. The system may provide a reputation score in response to each of the plurality of queries. A reputation score reflects the likelihood that a queried object is malicious (e.g., malware or a file infected with a virus). A data security system may use reputation score to determine a course of action (e.g., to quarantine the file, delete the file, and/or stop any threads from running that utilize the file). A reputation score may be determined based on a plurality of factors. Factors for determining reputation score may comprise the contents of an object, a number of queries for an object, and/or prevalence of an object. Each factor may serve as an indicator of the reputation score. For example, prevalence may represent a number unique of devices that have queried a data security system for an object and may be used in providing a reputation score. Similarly, a number of queries for an object may be used in providing of a reputation score. As an example, a server-side polymorphic malware has very low prevalence because each file instance output by the server, if hashed has a different hash value. Accordingly, a low prevalence may correspond to a low reputation score while a high prevalence may correspond to a high reputation score. In an example, some objects are highly prevalent and are known to be malicious; in such a case, a high prevalence score may not correspond to a high reputation score.

The challenges of implementing a data security system to provide a reputation score are not trivial. For example, the system may comprise one or more distributed components (e.g., servers distributed in different cities, states, or countries) and may process queries from multiple devices. Each device may be a different type of device (e.g., various operating systems) and remote from the data security system. Thus, implementing such a system may require complex distributed processing to provide a reputation score based on a plurality of factors. For example, calculating a prevalence of a file by counting a number of unique devices that have queried for the file may require maintaining a list of unique devices for the file. Consider the following illustration of a challenge of counting the number of unique devices. Assuming that the number of devices is of order of magnitude $10^7$, the number of files is of order of magnitude $10^9$, and the number of countries is of order of magnitude $10^2$, then the system may process data records for $10^{18}$ entries (e.g., querying database records, or joining across multiple tables in a database) to count the number of unique devices. Thus, counting the number of unique devices may require significant processing and storage capacity in order to calculate, store, and query the requisite data. Furthermore, each device reporting a file for the first time may require a global state change (e.g., increment of count) which potentially creates a high data churn rate. Further, a process that counts the number of devices may have a time complexity of O(n).

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not, in itself, dictate a relationship between the various embodiments and/or configurations discussed.

Prevalence Information Using Query Data

A system that provides data security information by determining a statistically-based estimate of prevalence information or a number of queries using query data may require less computation and storage capacity and increase the responsiveness of the system. Advantageously, this provides a mathematically justifiable estimate of the prevalence and can be determined at the time that the query was received (i.e., at query time, in real-time, or in near real-time), thereby avoid long latencies resulting from processing a large number of data records.

FIG. 1 is component diagram illustrating an exemplary system for providing data security information comprising reputation information, according to one or more embodiments of the present specification. In this example, security information system 100 comprises security servers 102, reputation information systems 104, communication network 106, and communication devices 108. Communication devices 108 transmit data to and/or receive data from security servers 102 via communication network 106.

Communication devices 108 may each submit, to security servers 102 via communication network 106, a query (e.g., query data) for security information related to an object. Security information may include, for example, a reputation score, a prevalence score, a number of queries, and/or a number of unique devices that have queried. In an implementation, communication devices 108 may generate query data to request a prevalence score of a file based on a user selection to query for the file. Alternatively, an application executing on a communication device 108 may generate query data as part of a data scanning procedure. In an implementation, communication devices 108 may include at least one of a computing device, a wired or wireless communication device, a mobile phone, a desktop computer, or any other communication device that may submit queries for security information.

Security servers 102 may be configure to provide, to communication devices 108, data security information for an object based at least in part on an output of reputational information system 104 for the object. In response to receiving query data from communication devices 108, security servers 102 may process the query data and/or provide the query data to reputation information systems 104 for processing. After processing the data, security servers 102 may transmit, to communication devices 108, a response containing security information related to the object. The response may include whether the object is malicious, a level of confidence for the indication, a reputation score, a prevalence, a number of queries, a number of unique devices that have queried, and/or estimates thereof. An exemplary implementation of security servers 102 may provide a Web-based framework for transmitting a response to communication devices 108.

Communication network 106 may be configured to transmit data between security servers 102 and communication devices 108. An exemplary implementation of communication network 106 may utilize wireless or wired technologies (e.g., local area network (LAN), wireless LAN, cellular network) and may support various communications and/or security protocols (e.g., Internet Protocol (IP), Hypertext Transfer Protocol (HTTP), Secure Sockets Layer (SSL), Simple Object Access Protocol (SOAP)).

For clarity, FIG. 1 depicts a specific number of each of communication devices 108, security servers 102, and communication network 106. However, any number of servers, devices, and networks may be implemented in a system according to one or more embodiments of the present specification. In addition, the exemplary reputation information system 104 depicted in FIG. 1 shows two components 104a and 104b. However, reputation information system 104 may be implemented in a one location (e.g., a single device) or in multiple locations (e.g., distributed across multiple devices).

Figure 2:
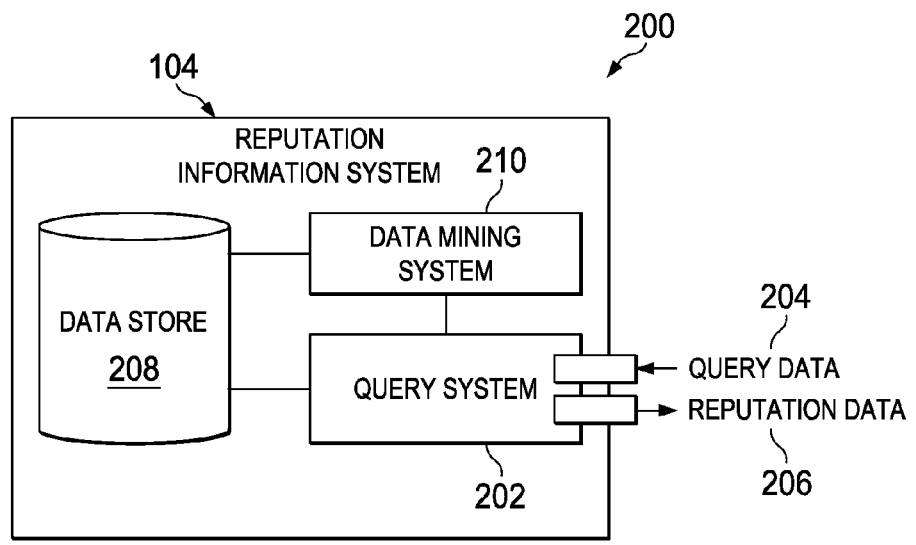
FIG. 2 is a block diagram of a reputation information system according to one or more embodiments of the present specification.

FIG. 2 is a block diagram of a reputation information system according to one or more embodiments of the present specification. Reputation information system 104, as depicted in FIG. 2, is an exemplary implementation of reputation information system 104, as depicted in FIG. 1. In this example, reputation information system 104 comprises query system 202, data store 208, data mining system 210, query data 204, and reputation data 206. Each of query system 202, data store 208, and data mining system 210 are coupled to one another to allow two-way transmission of data between the systems and data store.

Query System 202 receives query data 204 and outputs reputation data 206. In an implementation, query system 202 may react to an emerging threat or a well-known threat using different approaches. An emerging threat may be file with low prevalence and unknown level of security threat. A well-known threat may be a file with high prevalence and a known level of security threat. For an emerging threat, for example, the system may immediately update and publish the updated reputation score to a cloud-based server. However, for a well-known threat, the system may neither immediately update the reputation score (e.g., since the reputation is known and may be relatively stable) nor immediately publish an updated reputation score to a cloud-based server. Instead, the data for a well-known threat may be processed by data mining system 210, and used to later update and publish the updated reputation score to the cloud-based server. A difference in the treatment is the speed with which the reputation is updated and/or distributed. For low prevalence files, it may important to quickly publish an updated estimate, since the threat may be quickly evolving (e.g., polymorphic malware). For high prevalence files, it may be important to provide detailed analysis and historical context to determine, e.g., how a malicious file is spreading and the mechanism by which the malicious file is spread.

Figure 3:
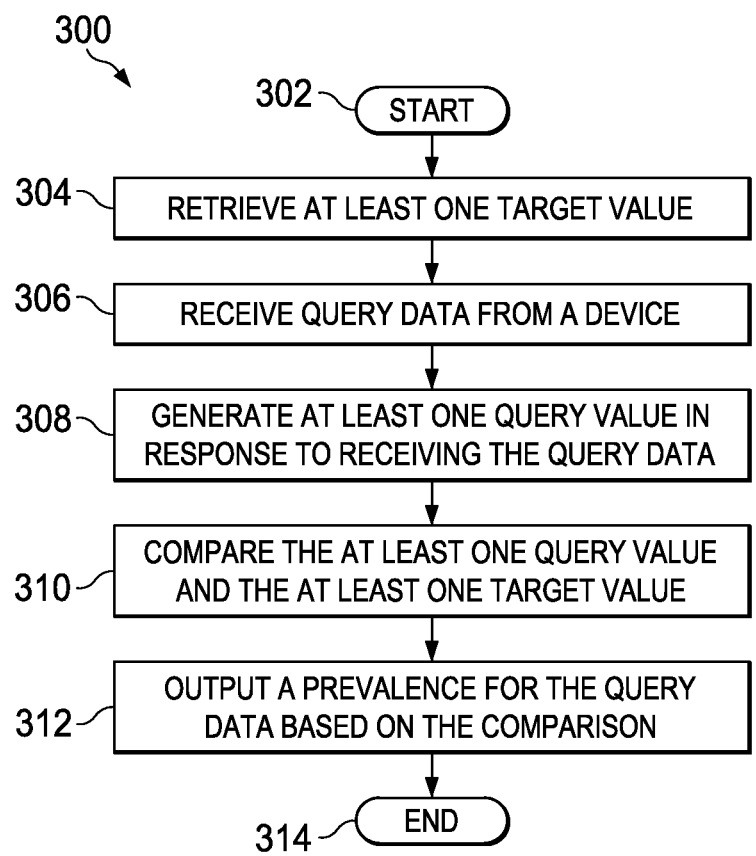
FIG. 3 is a flow chart illustrating logic for providing prevalence information for query data according to one or more embodiments of the present specification.
Figure 6B:
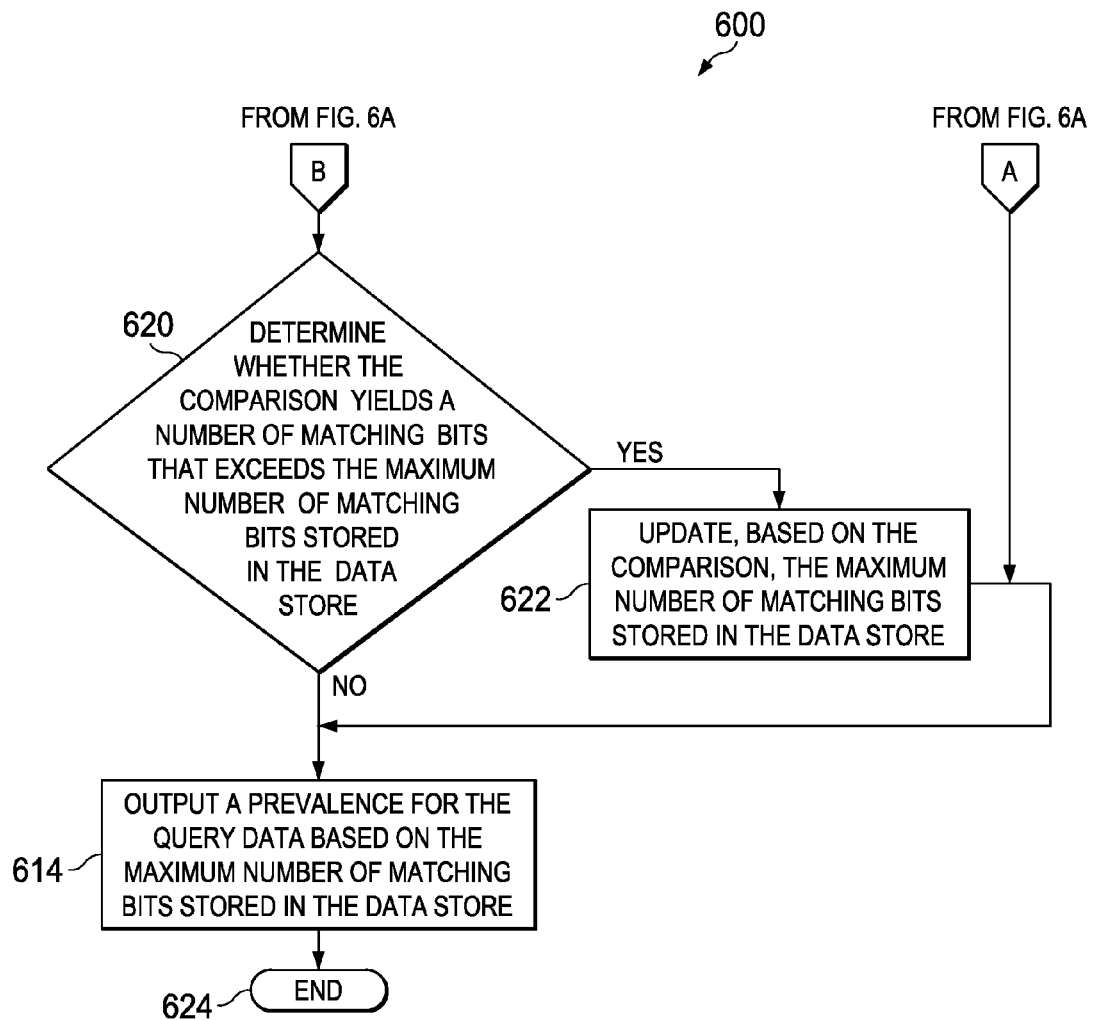

In an embodiment, query system 202 may implement, using at least one processor, logic for providing prevalence information. For example, query system 202 may implement logic for providing prevalence information for query data, as depicted in FIG. 3, and/or logic for providing prevalence information for a hash of a file, as depicted in FIGS. 6A and 6B.

Query data 204 encapsulates the data used to query the reputation information system 104. In an embodiment, query data 204 may comprise at least one of an identifier associated with a device, metadata for communication device 108, and/or an identifier associated with a file. An identifier associated with a device may comprise a device identifier, a globally unique opaque identifier of the device that generated and/or submitted the query, a hash of a device identifier, an operating system present on the device. Metadata for communication device 108 may comprise an IP address of the device that generated and/or submitted the query, a country in which the device is located, and/or combination thereof. An identifier associated with a file may comprise a file identifier, a globally unique opaque identifier of the file subject to the query, a globally unique opaque hash of the file subject to the query, a hash of at least a portion of the contents of a file, a hash of the entire of the whole content of a file, a uniform resource locator (URL) for a file, and/or any combination thereof.

Reputation data 206 encapsulates the data used to provide reputation information. In an implementation, reputation data 206 may comprise an at least one of an estimate and exact response. For example, reputation data 206 may include an estimate or an exact number of unique devices that have queried for an object or number of queries received for the object (e.g., regardless of the querying device).

Data store 208 may be configured to store data received from communication devices 108, data mining system 210, or query system 202. The data stored in data store 208 may include query data 204, reputation data 206, or other data related to reputation or security. In an exemplary implementation, data store 208 may comprise at least one of a relational database, a massively parallel-processing (MPP) database, a structure query language (SQL) database (e.g., CSR/Database Instances), a NoSQL databases, MongoDB, and/or Hadoop.

Data mining system 210 may be configured to access data store 208, query system 202, query data 204 and/or reputation data 206. In an implementation, data mining system 210 may utilize at least one of statistical analysis, clustering, classification, machine learning, MapReduce, and/or regression.

Statistical Model for Estimating Prevalence Based on a Number of Queries

The prevalence of an object may be estimated based on a number of queries received for the object. Accordingly, an estimate of a number of queries that a system has received for an object may serve as an estimate of the prevalence of the object. A statistical model for estimating prevalence based a number of queries may represent a query for an object (e.g., a file, a hash of a file, etc.) file as an outcome of rolling an n-sided dice, where each "side" has an equal probability of being the outcome of the roll. As will be discussed, the value of n serves as an estimate of the number of queries that have been received for the object. The outcome of rolling the n-sided dice may be a query value. A target value of the dice may be an integer value where $0<\text{target value}\leq n$. In this example, the likelihood that the query value matches the target value correlates to the likelihood that the dice have been rolled n number of times. In other words, if the outcome of the dice matches the target value, then it can be estimated that the dice have been rolled n number of times. Since a roll of the dice represents a query, an estimate that the dice has been rolled n number of times corresponds to an estimate that n number of queries have been received for the object. Therefore, the model may provide an estimate of the prevalence based on a mathematically justifiable estimate of the number of queries for an object.

Since a number of queries received for each object may be different between files, the model may be individually applied to each object. Before any queries have been received for an object, the number of queries for the object is known; it is equal to zero. From this initial point, a value of n may be selected to identify target values of interest. If, for example, the value of n is incrementally set to a value that represents an order of magnitude (e.g., 1; 10; 100; 1,000; 10,000; 100,000; etc.), the model may provide an estimate for the order of magnitude of the number of devices that that have queried for the object. As a further example, both the value of n and target value may be set to 10. Each time the dice is "rolled," the outcome (i.e., the query value) is compared to the target value. In an implementation, a random number generator (RNG) may generate values to represent an outcome of rolling the n-sided dice. If the outcome matches the target value, the value of n may be recorded as an estimate of the number of queries for the object. After the estimate is recorded, the value of n may be increased to the next number of interest (e.g., the next order of magnitude, which in this example increases from 10 to 100). For example, if 4 queries have been received, then the order of magnitude may be 1; if 354,001 queries have been received, then the order of magnitude may be 100,000. Ion an implementation, after the outcome matches the target value, the target value may be increased to match the value of n, remain the same value, or be assigned a new value greater than zero and less than or equal to n. For each object, values for each of estimate values, query values, target values, and/or values for n may be individual stored.

FIG. 3 is a flow chart illustrating logic for providing prevalence information for query data according to one or more embodiments of the present specification. The logic in FIG. 3 is an implementation of a statistical model for estimating prevalence based on a number of queries. In this example, logic 300 comprises start point 302, retrieving at least one target value 304, receiving query data from a device 306, generating at least one query value in response to receiving the query data 308, comparing the at least one query value and the at least one target value 310, outputting a prevalence for the query data based on the comparison 312, and end point 314.

Logic 300 begins at start point 302. Start point 302 may coincide with a start/end point of other logic, routines, applications, or threads. In addition, at start point 302, data (e.g., objects, values, variables, etc.) may be initialized, retrieved, or accessed for use in logic 300.

Next, at procedure 304 to retrieve at least one target value. The at least one target value may be implemented as one of a single value, a sequence of values, a sequence of bits, an identifier associated with a device, an identifier for the first device that queried for a file, or any value that may be compared with other values (e.g., query values) for each query. The target value may be retrieved from a data source (e.g., data source 208) or may be generated. For example, the target value may be a sequence of bits generated based on a device identifier associated with a device or a value of an n-sided dice, as described above with respect to the statistical model.

At procedure 306, query data (e.g., query data 204) is received from a device (e.g., communication device 108). For example, a file and a request for the prevalence of the file may be received from a communication device.

In response to receiving the query data, at least one query value is generated, according to procedure 308. In an implementation, the query value may be an identifier associated with the device (i.e., the querying device), a randomly generated number, a hash of an identifier associated with the device, or any value that may be compared with other values (e.g., target values) for each query.

The at least one query value is compared to the at least one target value at procedure 310. For ease of comparison, the target value and the query value may be implemented in the same way (e.g., each of the target value and the query value is a sequence of bits, each is an integer value, etc.). The comparison may comprise comparing the values by determining which is a larger/smaller value, determining whether the values are equal, performing a pairwise comparison of the values, and/or determining whether the values are in the same format. The format may comprise, e.g., a type of encoding, a type of hash used to produce the sequence, and/or a length of a sequence of bits. A result of the comparison may be directly output as a prevalence value (e.g., as an estimate thereof), or may serve as the basis for other computations. For example, the result may be an input to a model, such as a statistical model and/or simulation, to determine prevalence for the query data.

At procedure 312, a prevalence (for the query data is output. The prevalence may comprise a prevalence value, an estimated number of queries, an estimated number of unique devices that have queried for an object, etc. The prevalence may be calculated based on the result of comparing a query value and a target value. For example, a prevalence value may be output from the reputation information system to the device that submitted the query data. In an implementation, query data may be received from a first device and the corresponding reputation information may be provided to a second device, or a plurality of devices.

Finally, the logic ends at end point 314. End point 314 may serve as a start/end point for other logic, routines, applications, or threads. For example, end point 314 may direct a processor to, upon receiving a subsequent query, execute logic beginning with start point 302.

Statistical Model for Estimating Prevalence Based a Number of Unique Devices

The prevalence of an object may be estimated based on a number of unique devices that have submitted queries for the object. Accordingly, an estimate of the number of unique devices that have submitted queries for the object may serve as an estimate of the prevalence of the object. A statistical model for estimating prevalence based the number of unique devices may represent a querying device as a binary number having a random distribution of bits. For example, a hash function may be applied to a unique identifier associated with the querying device (e.g., a device ID) to generate a sequence of bits with a random (or pseudo-random) distribution of bits. In an implementation, the hash function may be one of several well-known hashing algorithms. For example, the hash function may be one of message-digest algorithm 5 (MD5), secure hash algorithm 1 (SHA1), and/or secure hash algorithm (SHA256). The binary number may be a query value. When a first query is received from a device for an object, a query value (i.e., the binary number having a random distribution of bits) for the device is generated and stored as target value. For each subsequent query from a device other than the first device, a query value for the incoming query is compared to the query value for the first device (i.e., the target value) to determine a number of consecutive matching bits, beginning with the first bit in the sequence. The number of matching bits may be stored only if it is larger than a maximum number of matching bits (n_max). The maximum number of matching bits (n_max) represents the largest number of matching bits observed for an object. The likelihood of a high number of matching bits correlates to a likelihood of a high number of unique devices that have queried for the object. In other words, an increasing maximum number of matching bits correlates to an increasing likelihood of a higher number of unique devices that have queried for the object which. Therefore, the model provides an estimate of the prevalence based on a mathematically justifiable estimate of the number of unique devices that have queried for the object.

In this model, repeat queries for the same file from the same device have no effect on the estimate of the number of unique devices that have queried for the object. The following is simple proof that this is the case:

(1) Any incoming query from a device for which a number of matching bits (n_i) with the first device is greater than the current maximum number of matching bits (n_max) results in n_max taking on the value of n_i. If the device submits another query for the same file, n_i must be less than or equal to n_max so the subsequent query will have no affect on the value of n_max.

(2) Any incoming query from a device for which a number of matching bits (n_i) with the first device is less than or equal to the current maximum number of matching bits (n_max) results in no change to n_max. If the device submits a subsequent query for the same file, n_i must be less than or equal to n_max so the subsequent query will have no affect on the value of n_max.

Statistical properties of the model may be derived based, at least in part, on the length of the binary number (i.e., the length of the sequence of bits, or N). For a given length of the sequence of bits, N, the number of unique sequences of bits is finite and is defined by (2N−1). The number of unique sequences of bits represents the number of unique devices that the model may represent for a value of N. Moreover, a number of ways that the number of unique devices can be ordered is finite and is defined by ((2N−1)!). The number of ways that the number of devices can be ordered represents the number of ways (i.e., the order or querying devices) in which the devices may query for an object. Thus, for any desired number of consecutive matching bits (n_match), where 0<n_match≤N, it is possible to generate a finite probability distribution for the probability that the $x^{th}$ query for an object results in a number of consecutive matching bits equals n_match.

As an illustration, a number of white balls (n_white) may represent a number of devices for which the number of consecutive matching bits equals n_match; a number of black balls (n_black) may represent a number of all other devices (i.e., devices for which the number of consecutive matching bits does not equal n_match). The model corresponds to a bag including the number of white balls and the number of black balls. The total number of balls in the bag (total) represents the total number of unique devices represented by the model (e.g., the number of unique bit sequences). Thus, the probability that the $x^{th}$ ball drawn from the bag is white (i.e., P(x)) probability that the $x^{th}$ ball drawn from the bag is white (i.e., P(x)) can be expressed as follows:

$$total = (2N-1)$$

$$n\_white = ((2^{(N-n\_match)})-1)$$

$$n\_black = total - n\_white$$

$$P(1) = n\_white/n\_total$$

$$P(x) = P(x-1)*(n\_black-(x-1))/(total-(x-1))$$

Figure 4:
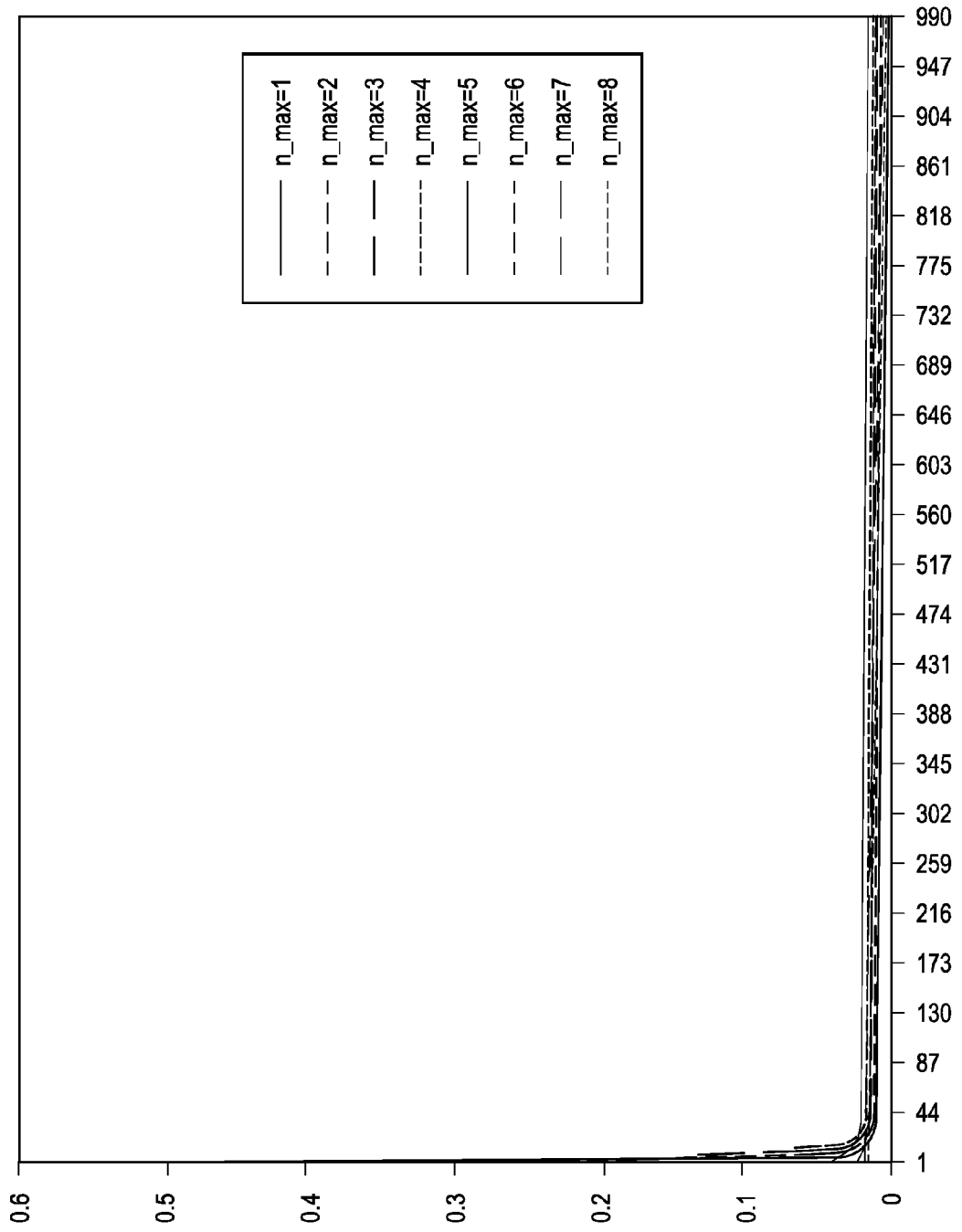
FIG. 4 is a graphical representation of probability distributions for matching, to varying numbers of consecutive values, query values to target values, according to one or more embodiments of the present specification.

FIG. 4 is a graphical representation of probability distributions for matching, to varying numbers of consecutive values, query values to target values, according to one or more embodiments of the present specification. The probability distributions in FIG. 4 were generated using the above equations, where N=10 and n_target was given integer values ranging from 1-8.

FIG. 5 is a chart showing an exemplary correspondence, based on cumulative probabilities, between a maximum number of matching values (e.g., n_max) and prevalence information, where N=64. Specifically, values of n_max are provided with a corresponding:

(1) Range of order of magnitude (OOM) values (e.g., 1; 10; 100; 1,000; 10,000; 100,000; etc.);

(2) Accuracy of the exact range of OOM, which is labeled "Prob" in FIG. 5. Specifically, this value represents the probability that, for the given n_max, the actual number of query values lies within the OOM range. A threshold probability of >0.7+/−0.2 is applied; and (3) Accuracy of the exact range of OOM, plus or minus one OOM range, which is labeled "OOM+−Prob" in FIG. 5. Specifically, this value represents the probability that, for the given n_max, the actual number of query values lies within a given OOM range, one OOM range above the given range, or one OOM range below the given range. A threshold probability of >0.95 applied.

Cumulative probabilities provide an exemplary statistical basis for relating the number of matching values (or range of numbers of matching values) to a corresponding prevalence value. The specific numbers for n_max may be calculated based on the desired level of detail for the system. For example, a desired level of detail may be order of magnitude (OOM) values (e.g., 1; 10; 100; 1,000; 10,000; 100,000; etc.) or ranges. The OOM values provide an estimate of the order of magnitude of the number of unique devices that have queried for an object. For a desired range OOM values, the system may provide corresponding values of n_max to achieve a specified cumulative probability. Similar correspondence data may be generated for any chosen values for a desired level of detail.

In FIG. 5, an n_max of <5 corresponds order of magnitude (OOM) range of 1-10 with cumulative probability of 0.4 and corresponds to an OOM range of 1-100 with cumulative probability of 1. Each of the remaining values of n_max (i.e., 5, 9, 12, 15, and 19), correspond to increasing (OOM) ranges (i.e., 10-100, 100-1,000; 1K-10K; 10K-100K; 100K-1M, respectively) with each having a cumulative probability of at least 0.68, or approximately 0.7. Moreover, each of the remaining values of n_max corresponds to an OOM, plus or minus one OOM, with a cumulative probability of at least 0.98. Similar correspondence data may be generated for any chosen value of n_max. In this example, for any value of x, where n_max=x, the cumulative probability for OOM equal to the range $10^{z-1}$ through $10^z$ may be calculated by $\Delta[P(10^{z-1}|n\_max=x), P(10^z|n\_max=x)]$ and the cumulative probability for plus or minus one OOM may be calculated by $\Delta[P(10^{z-2}|n\_max=x), P(10^{z+1}|n\_max=x)]$. These expressions represent a difference in cumulative probability between endpoints of ranges $10^{z-1}$ through $10^z$ and $10^{z-2}$ through $10^{z+1}$, respectively.

In an implementation, data similar to that in FIG. 5 may be used to relate a result of comparing a query value and a target value (e.g., comparisons 310 and/or 618) to an estimate of the number of unique devices that have queried for an object. Such data provides an estimate of prevalence based on a mathematically justifiable estimate of the number of unique devices that have queries for an object.

An exemplary algorithm may implement the statistical model for estimating prevalence based a number of unique devices as follows:
  i. For the first incoming query Q_1 for file f_x store a device identifier D_1, where the device identifier identifies the device from which the query came. Initialize n_max equal to zero, where n_max represents the currently recorded maximum number of matches between D_1 and other device identifiers, for the file f_x.
  ii. For each subsequent query Q_z for the file f_x, from a device with device identifier D_y, do the following:
    If the D_y does not equal D_1: determine a number of consecutive matching bits n_y, beginning from the first bit and advancing upwards, where D_1 and D_y match; and if n_max, is less than n_y, then set n_max to be n_y.

The more unique device identifiers encountered the more likely it is that we will encounter higher values for n. Therefore, the currently recorded n_max for any file is a statistically justifiable indicator of the number of unique devices that have queried for file f_x.

The exemplary algorithm above can be extended to track the three most popular countries as follows:
  i. For each file f_x, record three tuples of the form (c, n_max) where c is a country code and n_max is the maximum value of n calculated from queries from the associated country j for f_x.
  ii. For each incoming query for file f_x, from device D_i that is located in country c_j:
    If c_j matches one of the countries in the three tuples:
      If n_i is greater than the currently recorded n_max for c_j, then set n_max to n_i.
    If c_j does not match any of the countries in the three tuples:
      If n_i is greater than the currently recorded n_max values for any of the countries in the three tuples, then replace the tuple with the lowest n_max value with (c_j, n_i).

This exemplary algorithm stores three tuples to hold an identifier for the three countries reporting the highest value of n_max for file f_x and therefore, provides a statistically justifiable indication of the three countries with the most devices reporting presence of file f_x. Furthermore, for each tuple change, the value of n_max is increasing so the number of data changes (churn) can be no more than 3 times that of the churn required to track the global prevalence of the same file.

Advantageously, an implementation of this algorithm need not count unique device IDs and, thus the time complexity does not depend on the number of unique device IDs. Instead, providing results may be O(1) time complexity (i.e., constant time) and, therefore, can be applied in real-time (e.g., at query time in a web server). Moreover, the space require for this algorithm is reduced relative to the requirements for storing all unique Device IDs.

In an implementation, the statistical approach may store a device ID to advantageously address a case where one device sends multiple queries for the same object. The storage of the device ID may be, e.g., a single point of reference that provides a reproducible output for subsequent queries from the same device without counting all previous queries for the object. Moreover, multiple devices (e.g., web servers and/or data centers) may advantageously provide responses to global query traffic using a data system that need not record a device ID for each querying device.

FIGS. 6A and 6B depict a flow chart illustrating logic for providing prevalence information for a hash of a file according to one or more embodiments of the present specification. The logic depicted in FIGS. 6A and 6B is an exemplary implementation of the prevalence estimation algorithm described above. In this example, logic 600 comprises start point 602; receiving a hash of a file from a device 604; generating a sequence of bits based on an identifier for the device 606; determining whether the hash of the file is already stored in a data store 608; storing, in the data store, the sequence of bit, the hash, and an association between the sequence of bits and the hash 610; storing, in the data store, a maximum number of matching bits equal to zero 612; outputting a prevalence for the query data based on the maximum number of matching bits stored in the data store 614; determining whether the sequence of bits is already stored, in the data store, with an association to the hash 616; comparing the generated sequence of bits and the sequence of bits stored in the data store 618; determining whether the comparison yields a number of matching bits that exceeds the maximum number of matching bits stored in the data store 620; updating, based on the comparison, the maximum number of matching bits stored in the data store 622; and end point 624.

Logic 600 begins at start point 602. Start point 602 may coincide with a start/end point of other logic, routines, applications, or threads. In addition, at start point 602, data (e.g., objects, values, variables, etc.) may be initialized, retrieved or access the system may initialize or retrieve objects and/or variables for use in logic 600.

Next, at procedure 604, a hash of a file is received from a device. The hash of the file is an exemplary query data (e.g., query data 204). Alternatively, the file may be received from the device, and the hash of the file may be generated as part of the execution of logic 600 or may be generated by a third-party. The hash may be received by at least one of query system 202, reputation system 104, or security servers 102.

A sequence of bits is generated, based on an identifier for the device at procedure 606. In an implementation, the identifier may be one of a unique identifier for the device, a globally unique opaque identifier of the device that generated and/or submitted the query, an operating system present on the device, the name of the owner of the device, or any other identifier associated with the device. For example, a hash function may be applied to an identifier to generate a sequence of bits with a random (or pseudo-random) distribution of bits. In an implementation, the hash function may be one of MD5, SHA1, and/or SHA256.

Next, logic 600 determines whether the hash of the file is already stored in a data store, at procedure 608. This procedure checks whether the received hash of the file represents the first query for the file.

If it is determined that the hash of the file is already stored in a data store, then, the sequence of bits, the hash, and an association between the sequence of bits and the hash is stored in the data store, according to procedure 610. This branch of logic 600 may handle a case where the receipt of the hash represents the first query for the file. In the case of the first query for the file, the current value of a maximum number of matching bits (e.g., n_max) is zero. Thus, at procedure 612, a maximum number of matching bits set to equal to zero. At procedure 614, a prevalence for the query data based on the maximum number of matching bits stored in the data store. In the case of the first query for the file, the prevalence may indicate that this query is the first query for the object. For example, a prevalence value of one of zero, one, a low value, and/or null may be output.

If, at procedure 616, it is determined that the hash of the file is not already stored in a data store, then another determination is made at procedure 616. Specifically, it is determined whether the generated sequence of bits is already stored, in the data store, with an association to the hash. This may represent a case where the receipt of the hash from the device may not represent a subsequent query from a device that previously queried for the same hash. Although the received query may not be the first query for the hash of the file, it may represent the first time that this device queried for the hash.

If, at procedure 616, it is determined that the generated sequence of bits is already stored with an association to the hash, then a prevalence for the file may be output based on based on the maximum number of matching bits stored in the data store. This represents a case where the receipt of the hash from the device represents a subsequent query from a device that previously queried for the same file.

If it is determined that the generated sequence of bits is not already stored with an association to the hash, then the generated sequence of bits is compared to the sequence of bits stored in the data store, at procedure 618. The sequence of bits stored in the data store may represent a target value, which was stored in response to the first query for the hash of the file. The generated sequence of bits may represent a query value, generated in response to a subsequent query for a hash of the file. In an implementation, the comparison may be executed as described in relation to procedure 310 and/or FIG. 5.

At procedure 620, it is determined whether the comparison yields a number of matching bits that exceeds the maximum number of matching bits stored in the data store. Subsequent queries from a device that has previously queried for the same file have no affect on the maximum number of bits stored in the data store. Upon receiving a subsequent query data from a communication device, the comparison will result in a number of matching bits that is less than or equal to the currently stored maximum number of matching bits. Thus, logic 600 maintains the maximum number of matches in the data store by not updating the maximum number. A simple proof of such a result is provided herein for the statistical model for estimating prevalence based a number of unique devices.

If the comparison yields a number of matching bits that exceeds the maximum number of matching bits (e.g., n_max) stored in the data store, the value (n_max) is updated based on the comparison, according to procedure 622. In an implementation, at procedure 622, the maximum number of matching bits may be updated to take on the value of the number of matching bits determined from the comparison at procedure 620.

At procedure 614, a prevalence for the query data based on the maximum number of matching bits stored in the data store 614 is output. Using at least one statistical model, a prevalence value and/or a degree of confidence in the prevalence value may be determined based on the maximum number of matching bits (n_max). For example, using the values in FIG. 5, a prevalence value may be output. In FIG. 5, n_max equal to 9 corresponds to the probability that the actual prevalence is between 100 and 1,000 is 0.69. For example, the output prevalence value(s) may comprise a range of OOM values (e.g., 100 and 1,000), a single value in the range (e.g., 999), or an endpoint of the range (e.g., 100 or 1,000). The prevalence value may be weighted based on a degree of confidence in the prevalence value, such as the probability that the actual prevalence is equal to or within the range f the prevalence value).

Finally, the logic ends at end point 624. End point 624 may serve as a start point for the other logic, routines, applications, or threads. For example, end point 624 may direct a processor to, upon receiving a subsequent query, execute logic beginning with start point 602. Moreover, logic 600 may be modified to track the three most popular countries as discussed regarding an extension of the basic algorithm.

In an implementation, logic 600 may operate in a manner similar to logic 300. Receipt of a hash of a file from a device in procedure 604 may correspond to receipt of receive query data in procedure 304. Based on procedures 606-612, the system may generate and store a sequence of bits based on an identifier for the first device, which may correspond to the target value, as provided in procedure 304. The system accesses the data store and compares several sequences of bits at procedures 616-622, which may correspond to procedure 310. The system also outputs a prevalence based on data stored in the data store at procedure 614, which may correspond to procedure 312.

For logic 300 and/or 600, the length of a sequence of values (e.g., query values, target values, or bits) may be determined based on a threshold value. For example, the threshold value may correspond to an upper bound on a magnitude of the prevalence (e.g., 1,000 unique devices, or 1,000,000 unique devices), design parameters of the system, and/or an estimated number of devices that the system will encounter. In an example using bits as the values, a sequence length equal to 64 may provide enough unique sequences of bits to represent $2^{64}$, or $18 \times 10^{18}$, unique devices.

FIG. 7 is illustrates three exemplary sequences of bits corresponding to three devices, according to an embodiment of the present specification. In this Example, Device 1 corresponds to a bit sequence beginning with 01101000 . . . (e.g., the first device id), Device 2 a bit sequence beginning with 00101011 . . . (e.g., the second device id), and Device 3 a bit sequence beginning with 01101010 . . . (e.g., the third device id). The indices for the three sequences of bits are labeled $i_1$ through $i_n$. For simplicity, the full bit sequence is not shown.

The length of the sequence of bits (i.e., the value of N) may be determined based on a threshold value, e.g., as discussed for logic 300 and 600. In an implementation, using n equal to 64 may provide enough unique sequences of bits to represent $2^{64}$, or $18 \times 10^{18}$, unique devices, which may be sufficient to avoid potential problems (e.g., two different devices with exactly matching sequences of bits).

In this example, each of the three devices sent query data related to the same file. Device 1 sent the query data first, followed by Device 2, and then by Device 3. Thus, the first device id is stored in a data store (e.g., data store 208), for example, based on the logic provided by procedure 304 or 610. For each subsequent query from a new device related to the same file, identify a number of matching bits by comparing the new sequence of bits and the first device id, for example, based on the logic provided by procedures 606, 608, 616, and 618.

The comparison may comprise a pairwise comparing of consecutive bits in the first sequence of bits and corresponding consecutive bits in the second sequence of bits beginning with the first bit in each of the first and the second sequences of bits. An exemplary pairwise comparison of the first device id and the second device id of results in a number of matching values equal to one. This is because only the first values match between the two device ids (i.e., the values at index $i_1$) but the second values do not match (i.e., the values at index $i_2$). Although the third values match between the first device id and the second device id, the third value does not lie within a consecutive sequence of matching bits beginning from the first bit (i.e., the value at index $i_1$) and thus does not count toward the number of matching bits. A similar comparison between first device id and the third device id results in a number of matching values equal to six, which may be stored in a data store, for example, based on the logic provided by procedure 620 and 622. For each subsequent query related to the same file, sequence of bits corresponding to the querying device is compared to sequence of bits corresponding to first device to have queried for the same file (i.e., the first device id). By comparing consecutive values (i.e., permutations of the possible values) as opposed to any matching corresponding pair of values the system maintains a large number of unique values can thereby model large prevalence values.

Other values or sequences of values may be used in place of the sequence of bits corresponding to first device to have queried for the file. For example, a random sequence of values, a random sequence of bits, a sequence of bits corresponding to second device to have queried for the same file, a sequence of bits corresponding to any device to have queried for the file, or a random number.

Figure 8:
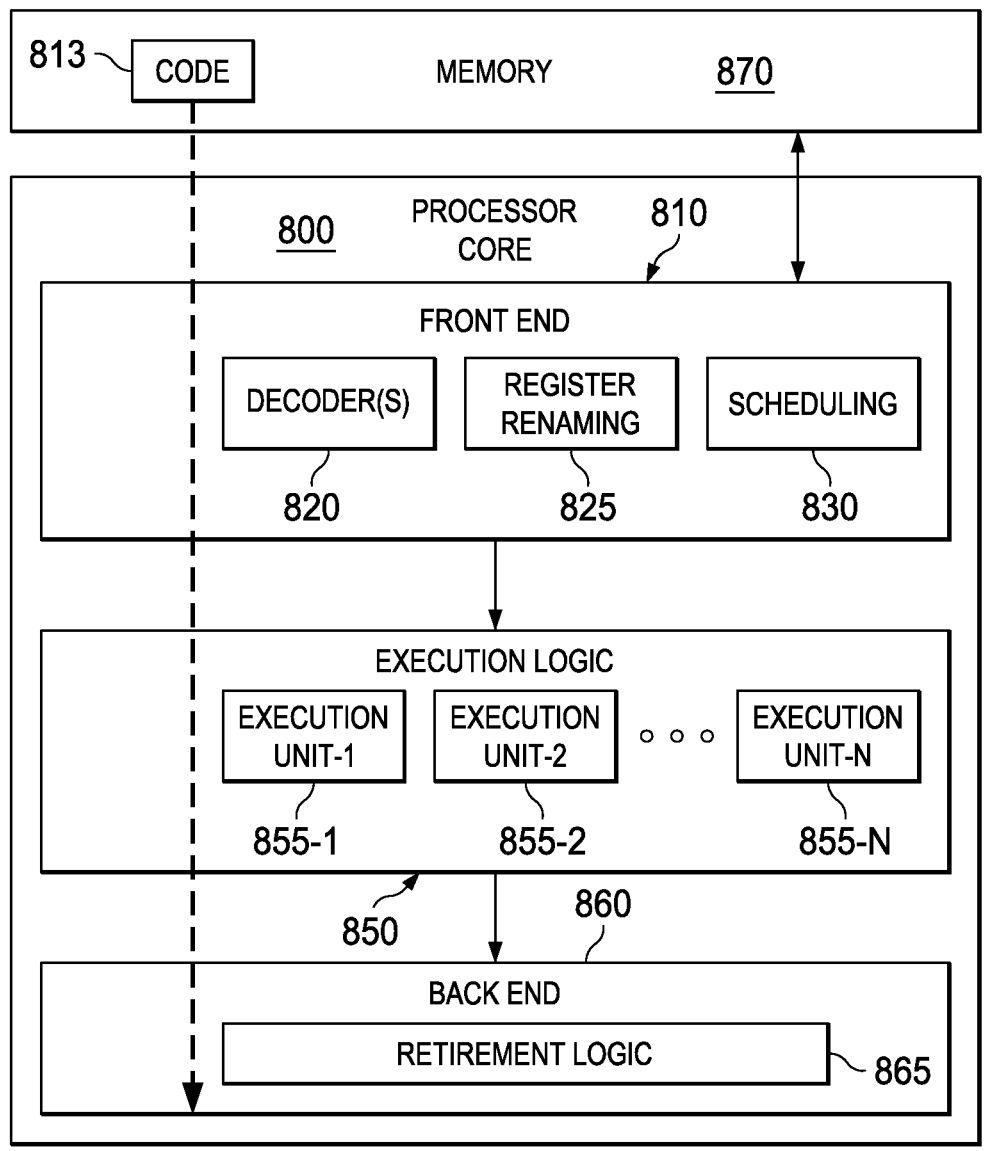
FIG. 8 is a block diagram of a memory coupled to an example processor according to an embodiment.

FIG. 8 is a block diagram of a memory coupled to an example processor according to an embodiment. FIG. 8 illustrates a processor core 800 according to one embodiment. Processor core 800 may be the core for any type of processor, such as a micro-processor, an embedded processor, a digital signal processor (DSP), a network processor, or other device to execute code. Although only one processor core 800 is illustrated in FIG. 8, a processing element may alternatively include more than one of the processor core 800 illustrated in FIG. 8. (See, e.g., multi-core embodiments in FIG. 9, below). Processor 800 may be any type of processor, such as a microprocessor, an embedded processor, a digital signal processor (DSP), a network processor, a multi-core processor, a single core processor, or other device to execute code. Processor core 800 may be a single-threaded core or, for at least one embodiment, the processor core 800 may be multithreaded in that it may include more than one hardware thread context (or "logical processor") per core. Such cores 800 may be configured to execute instruction code in a manner disclosed herein. This system shown in FIG. 8 may be used to carry out the functions describe herein to be performed by security server, reputation information system, query system, and any components shown in FIGS. 1, 2, etc.

FIG. 8 also illustrates a memory 870 coupled to the processor 800. The memory 870 may be any of a wide variety of memories (including various layers of memory hierarchy) as are known or otherwise available to those of skill in the art. The memory 870 may include one or more code instruction(s) 813 to be executed by the processor 800 core. The processor core 800 follows a program sequence of instructions indicated by the code 813. Each instruction enters a front end portion 810 and is processed by one or more decoders 820. The decoder may generate as its output a micro operation such as a fixed width micro operation in a predefined format, or may generate other instructions, microinstructions, or control signals, which reflect the original code instruction. The front end 810 also includes register renaming logic 825 and scheduling logic 830, which generally allocate resources and queue the operation corresponding to the convert instruction for execution.

The processor 800 is shown including execution logic 850 having a set of execution units 855-1 through 855-N. Some embodiments may include a number of execution units dedicated to specific functions or sets of functions. Other embodiments may include only one execution unit or one execution unit that can perform a particular function. The execution logic 850 performs the operations specified by code instructions.

After completion of execution of the operations specified by the code instructions, back end logic 860 retires the instructions of the code 813. In one embodiment, the processor 800 allows out of order execution but requires in order retirement of instructions. Retirement logic x65 may take a variety of forms as known to those of skill in the art (e.g., re-order buffers or the like). In this manner, the processor core 800 is transformed during execution of the code 813, at least in terms of the output generated by the decoder, the hardware registers and tables utilized by the register renaming logic 825, and any registers (not shown) modified by the execution logic 850.

Although not illustrated in FIG. 8, a processing element may include other elements on chip with the processor core 800. For example, a processing element may include memory control logic (see, e.g., MC 972 of FIG. 9, below) along with the processor core 200. The processing element may include I/O control logic and/or may include I/O control logic integrated with memory control logic. The processing element may also include one or more caches.

FIG. 9 is a block diagram of an example computing system that is arranged in a point-to-point (PtP) configuration according to an embodiment. Shown in FIG. 9 is a multiprocessor system 900 that includes a first processing element 970 and a second processing element 980. While two processing elements 970 and 980 are shown, it is to be understood that an embodiment of system 900 may also include only one such processing element. This system shown in FIG. 9 may be used to carry out the functions describe herein to be performed by security server, reputation information system, query system, and any components shown in FIGS. 1, 2, etc.

System 900 is illustrated as a point-to-point interconnect system, wherein the first processing element 970 and second processing element 980 are coupled via a point-to-point interconnect 950. It should be understood that any or all of the interconnects illustrated in FIG. 9 may be implemented as multi-drop bus rather than point-to-point interconnect.

As shown in FIG. 9, each of processing elements 970 and 980 may be multicore processors, including first and second processor cores (i.e., processor cores 974a and 974b and processor cores 984a and 984b). Such cores 974, 974b, 984a, 984b may be configured to execute instruction code in a manner disclosed herein.

Each processing element 970, 980 may include at least one shared cache 1896. The shared cache 1896a, 1896b may store data (e.g., instructions) that are utilized by one or more components of the processor, such as the cores 974a, 974b and 984a, 984b, respectively. For example, the shared cache may locally cache data stored in a memory 932, 934 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof While shown with only two processing elements 970, 980, it is to be understood that the scope of the present specification is not so limited. In other embodiments, one or more additional processing elements may be present in a given processor. Alternatively, one or more of processing elements 970, 980 may be an element other than a processor, such as an ASIC chip or a field programmable gate array. For example, additional processing element(s) may include additional processors(s) that are the same as a first processor 970, additional processor(s) that are heterogeneous or asymmetric to processor a first processor 970, accelerators (such as, e.g., graphics accelerators or digital signal processing (DSP) units), field programmable gate arrays, or any other processing element. There can be a variety of differences between the processing elements 970, 980 in terms of a spectrum of metrics of merit including architectural, microarchitectural, thermal, power consumption characteristics, and the like. These differences may effectively manifest themselves as asymmetry and heterogeneity amongst the processing elements 970, 980. For at least one embodiment, the various processing elements 970, 980 may reside in the same die package.

First processing element 970 may further include memory controller logic (MC) 972 and point-to-point (P-P) interfaces 976 and 978. Similarly, second processing element 980 may include a MC 982 and P-P interfaces 986 and 988. As shown in FIG. 9, MC's 972 and 982 couple the processors to respective memories, namely a memory 932 and a memory 934, which may be portions of main memory locally attached to the respective processors. While MC logic 972 and 982 is illustrated as integrated into the processing elements 970, 980, for alternative embodiments the MC logic may be discrete logic outside the processing elements 970, 980 rather than integrated therein.

First processing element 970 and second processing element 980 may be coupled to an I/O subsystem 990 via P-P interconnects 976, 986 and 984, respectively. As shown in FIG. 9, I/O subsystem 990 includes P-P interfaces 994 and 998. Furthermore, I/O subsystem 990 includes an interface 992 to couple I/O subsystem 990 with a high performance graphics engine 938. In one embodiment, bus 949 may be used to couple graphics engine 938 to I/O subsystem 990. Alternately, a point-to-point interconnect 939 may couple these components.

In turn, I/O subsystem 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present specification is not so limited.

As shown in FIG. 9, various I/O devices 914 may be coupled to first bus 916, along with a bus bridge 918 which may couple first bus 916 to a second bus 910. In one embodiment, second bus 920 may be a low pin count (LPC) bus. Various devices may be coupled to second bus 920 including, for example, a keyboard/mouse 912, communication device(s) 926 (which may in turn be in communication with the computer network 202), and a data storage unit 928 such as a disk drive or other mass storage device, which may include code 930, in one embodiment. The code 930 may include instructions for performing embodiments of one or more of the methods described above. Further, an audio I/O 924 may be coupled to second bus 920.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

Note that with the examples provided herein, interaction may be described in terms of two, three, or more computing devices. However, this has been done for purposes of clarity and example only. In certain cases, it may be easier to describe one or more of the functionalities of a given set of flows by only referencing a limited number of computing devices. Moreover, provision of reputation information, prevalence information, and analysis of security data according to one or more embodiments of the present specification are readily scalable and can be implemented across a large number of components, as well as more complicated/sophisticated arrangements and configurations. Accordingly, the examples provided should not limit the scope or inhibit the broad teachings of provision of reputation information, prevalence information, and analysis of security data as potentially applied to a myriad of other architectures.

It is also important to note that the functions related to provision of reputation information, prevalence information, and analysis of security data, illustrate only some of the possible functions that may be executed by, or within, systems illustrated in FIGS. 1-9. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

In one example implementation, various devices or components involved in implementing the embodiments described herein can include software for achieving the described functions, and these devices or components disclosed herein may comprise software embodied in one or more non-transitory, tangible media for facilitating the activities described herein. At least a part of the systems and devices (e.g., security server, reputation information system, query system, and any components shown in FIGS. 1, 2 etc.) disclosed herein may also include a memory device (or memory element) for storing information to be used in achieving the functions as outlined herein. Additionally, the systems and devices (e.g., security server, reputation information system, query system, and any components shown in FIGS. 1, 2, etc.) described herein may include one or more processors that is capable of executing software or an algorithm to perform the functions as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein, such as data store(s) and data source(s), should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and in any of the figures/drawings included herein may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element is provided to store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include one or more non-transitory, tangible, machine readable media having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "non-transitory machine readable medium" shall accordingly include, but not be limited to, memories such as solid-state memories, optical, and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

It should be noted that much of the infrastructure discussed herein (e.g., security server, reputation information system, query system, and any components shown in FIGS. 1, 2, etc.) can be provisioned as part of any type of network element. As used herein, the terms security server, reputation information system, query system, and any components shown in FIGS. 1 and 2 for provision of reputation information, prevalence information, and analysis of security data can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

In accordance with the well-established principle that an "applicant is entitled to be his or her own lexicographer," MPEP 2111.01(IV), citing *In re Paulson*, 30 F.3d 1475, 1480 (Fed. Cir. 1994), certain terms have been expressly defined herein. It is expressly intended that those terms have the definitions supplied, and that they not be given any interpretation inconsistent with those definitions.

The following examples pertain to some embodiments of the disclosure.

Example 1 is a machine readable non-transitory storage medium having instructions stored thereon for providing prevalence information based on a query, wherein the instructions when executed by at least one processors cause the at least one processors to perform the following operations: retrieving a sequence of target values from a data source; receiving query data from a communication device; generating a sequence of query values based on an identifier associated with the communication device; comparing the sequence of query values and the sequence of target values to identify a number of matching values; and outputting to the communication device a prevalence value for the query data based, at least in part, on the number of matching values.

In Example 2, the subject matter of Example 1 can optionally include: upon determining that the number of matching values exceeds a maximum number of matches stored in the data store, updating the maximum number of matches in the data store; and calculating, using a statistical model, the prevalence value and a degree of confidence in the prevalence value based on the maximum number of matches.

In Example 3, the subject matter of Example 1 or 2 can optionally include: receiving additional query data from the communication device, wherein the additional query data and the query data are the same; and in response to the receiving the addition query data, maintaining the maximum number of matches in the data store by not updating the maximum number of matches in the data store.

In Example 4, the subject matter of any of Examples 1-3 can optionally include the comparing comprising a pairwise comparing of consecutive values in the sequence of query values and corresponding consecutive values in the sequence of target values beginning with the first value in each of the sequence of query values and the sequence of target values.

In Example 5, the subject matter of any of Examples 1-4 can optionally include the retrieving the sequence of target values from the data source comprising: receiving first query data from a first communication device; generating a first sequence of bits based upon an identifier associated with the first communication device; and storing the first sequence of bits in the data store as the sequence of target values.

In Example 6, the subject matter of Example 5 can optionally include the receiving the query data from the communication device comprising receiving second query data from a second communication device, and wherein generating the sequence of query values based on an identifier associated with the communication device comprising generating a second sequence of bits based upon an identifier associated with the second communication device.

In Example 7, the subject matter of Example 6 can optionally include the generating a first sequence of bits comprising applying a hash function to the identifier associated with the first communication device to generate the first sequence of bits; and optionally including generating the second sequence of bits comprising applying the hash function to the identifier associated with the second communication device to generate the second sequence of bits.

In Example 8, the subject matter of Example 7 can optionally include the hash function comprising at least one of: a message-digest algorithm, a cryptographic hash function, message-digest algorithm 5 (MD5), secure hash algorithm 1 (SHA1), or secure hash algorithm (SHA256).

In Example 9, the subject matter of any of Examples 1-8 can optionally include the query data being a hash of a file.

In Example 10, the subject matter of any of Examples 1-9 can optionally include a length of the sequence of query values being determined based on a threshold value.

In Example 11, the subject matter of any of Examples 2-10 can optionally include: weighting the prevalence value based on the degree of confidence in the prevalence value.

In Example 12, the subject matter of any of Examples 1-11 can optionally include, wherein the prevalence value comprising at least one value corresponding to an order of magnitude.

In Example 13, the subject matter of any of Examples 2-12 can optionally include the degree of confidence comprising a probability calculated for the at least one value.

Example 14 is an apparatus for providing prevalence information based on a query, the apparatus comprising: at least one memory element; at least one processor coupled to the at least one memory element; a reputation information server coupled to the at least one processor, wherein the reputation information server is configured to: retrieve a sequence of target values from a data source; receive query data from a communication device; generate a sequence of query values based on an identifier associated with the communication device; compare the sequence of query values and the sequence of target values to identify a number of matching values; and output to the communication device a prevalence value for the query data based, at least in part, on the number of matching values.

In Example 15, the subject matter of Example 14 can optionally include the reputation information server being further configured to: upon determining that the number of matching values exceeds a maximum number of matches stored in the data store, update the maximum number of matches in the data store; and calculate, using a statistical model, the prevalence value and a degree of confidence in the prevalence value based on the maximum number of matches.

In Example 16, the subject matter of Example 14 or 15 can optionally include the reputation information server being further configured to: receive additional query data from the communication device, wherein the additional query data and the query data are the same; and in response to the receiving the addition query data, maintain the maximum number of matches in the data store by not updating the maximum number of matches in the data store.

In Example 17, the subject matter of any of Examples 14-16 can optionally include the comparing comprising a pairwise comparing of consecutive values in the sequence of query values and corresponding consecutive values in the sequence of target values beginning with the first value in each of the sequence of query values and the sequence of target values.

In Example 18, the subject matter of any of Examples 14-17 can optionally include retrieving the sequence of target values from the data source comprising: receiving first query data from a first communication device; generating a first sequence of bits based upon an identifier associated with the first communication device; and storing the first sequence of bits in the data store as the sequence of target values.

In Example 19, the subject matter of Example 18 can optionally include the receiving the query data from the communication device comprising receiving second query data from a second communication device, and optionally including generating the sequence of query values based on an identifier associated with the communication device comprising generating a second sequence of bits based upon an identifier associated with the second communication device.

In Example 20, the subject matter of Example 19 can optionally include the generating a first sequence of bits comprising applying a hash function to the identifier associated with the first communication device to generate the first sequence of bits; and optionally including generating the second sequence of bits comprising applying the hash function to the identifier associated with the second communication device to generate the second sequence of bits.

In Example 21, the subject matter of Example 20 can optionally include the hash function comprising at least one of: a message-digest algorithm, a cryptographic hash function, message-digest algorithm 5 (MD5), secure hash algorithm 1 (SHA1), or secure hash algorithm (SHA256).

In Example 22, the subject matter of any of Examples 14-21 can optionally include the query data being a hash of a file.

In Example 23, the subject matter of any of Examples 14-22 can optionally include a length of the sequence of query values being determined based on a threshold value.

In Example 24, the subject matter of any of Examples 15-23 can optionally include the reputation information server being further configured to: weight the prevalence value based on the degree of confidence in the prevalence value.

In Example 25, the subject matter of any of Examples 14-24 can optionally include the prevalence value comprising at least one value corresponding to an order of magnitude.

In Example 26, the subject matter of any of Examples 15-25 can optionally include the degree of confidence comprising a probability calculated for the at least one value.

Example 27 is a method for providing prevalence information based on a query, the method comprising: retrieving a sequence of target values from a data source; receiving query data from a communication device; generating a sequence of query values based on an identifier associated with the communication device; comparing the sequence of query values and the sequence of target values to identify a number of matching values; and outputting to the communication device a prevalence value for the query data based, at least in part, on the number of matching values.

In Example 28, the subject matter of Example 27 can optionally include: upon determining that the number of matching values exceeds a maximum number of matches stored in the data store, updating the maximum number of matches in the data store; and calculating, using a statistical model, the prevalence value and a degree of confidence in the prevalence value based on the maximum number of matches.

In Example 29, the subject matter of Example 27 or 28 can optionally include: receiving additional query data from the communication device, wherein the additional query data and the query data are the same; and in response to the receiving the addition query data, maintaining the maximum number of matches in the data store by not updating the maximum number of matches in the data store.

In Example 30, the subject matter of any of Examples 27-29 can optionally include the comparing comprising a pairwise comparing of consecutive values in the sequence of query values and corresponding consecutive values in the sequence of target values beginning with the first value in each of the sequence of query values and the sequence of target values.

In Example 31, the subject matter of any of Examples 27-30 can optionally include retrieving the sequence of target values from the data source comprising: receiving first query data from a first communication device; generating a first sequence of bits based upon an identifier associated with the first communication device; and storing the first sequence of bits in the data store as the sequence of target values.

In Example 32, the subject matter of Example 31 can optionally include the receiving the query data from the communication device comprising receiving second query data from a second communication device, and optionally including generating the sequence of query values based on an identifier associated with the communication device comprising generating a second sequence of bits based upon an identifier associated with the second communication device.

In Example 33, the subject matter of Example 32 can optionally include the generating a first sequence of bits comprising applying a hash function to the identifier associated with the first communication device to generate the first sequence of bits; and optionally including generating the second sequence of bits comprising applying the hash function to the identifier associated with the second communication device to generate the second sequence of bits.

In Example 34, the subject matter of Example 33 can optionally include the hash function comprising at least one of: a message-digest algorithm, a cryptographic hash function, message-digest algorithm 5 (MD5), secure hash algorithm 1 (SHA1), or secure hash algorithm (SHA256).

In Example 35, the subject matter of any of Examples 27-34 can optionally include the query data being a hash of a file.

In Example 36, the subject matter of any of Examples 27-35 can optionally include a length of the sequence of query values being determined based on a threshold value.

In Example 37, the subject matter of any of Examples 28-36 can optionally include: weighting the prevalence value based on the degree of confidence in the prevalence value.

In Example 38, the subject matter of any of Examples 27-37 can optionally include the prevalence value comprising at least one value corresponding to an order of magnitude.

In Example 39, the subject matter of any of Examples 28-38 can optionally include the degree of confidence comprising a probability calculated for the at least one value.

Example 40 is an apparatus for providing prevalence information based on a query, the apparatus comprising: means for retrieving a sequence of target values from a data source; means for receiving query data from a communication device; means for generating a sequence of query values based on an identifier associated with the communication device; means for comparing the sequence of query values and the sequence of target values to identify a number of matching values; and means for outputting to the communication device a prevalence value for the query data based, at least in part, on the number of matching values.

In Example 41, the subject matter of Example 40 can optionally include means for upon determining that the number of matching values exceeds a maximum number of matches stored in the data store, updating the maximum number of matches in the data store; and means for calculating, using a statistical model, the prevalence value and a degree of confidence in the prevalence value based on the maximum number of matches.

In Example 42, the subject matter of any of Examples 40-41 can optionally include means for receiving additional query data from the communication device, wherein the additional query data and the query data are the same; and means for in response to the receiving the addition query data, maintaining the maximum number of matches in the data store by not updating the maximum number of matches in the data store.

In Example 43, the subject matter of any of Examples 40-42 can optionally include the comparing comprising a pairwise comparing of consecutive values in the sequence of query values and corresponding consecutive values in the sequence of target values beginning with the first value in each of the sequence of query values and the sequence of target values.

In Example 44, the subject matter of any of Examples 40-43 can optionally include the means for retrieving the sequence of target values from the data source comprising means for receiving first query data from a first communication device; means for generating a first sequence of bits based upon an identifier associated with the first communication device; and means for storing the first sequence of bits in the data store as the sequence of target values.

In Example 45, the subject matter of Example 44 can optionally include the means for receiving the query data from the communication device comprising means for receiving second query data from a second communication device, and the means for generating the sequence of query values based on an identifier associated with the communication device comprising means for generating a second sequence of bits based upon an identifier associated with the second communication device.

In Example 46, the subject matter of Example 45 can optionally include the means for generating a first sequence of bits comprising means for applying a hash function to the identifier associated with the first communication device to generate the first sequence of bits; and the means for generating the second sequence of bits comprising means for applying the hash function to the identifier associated with the second communication device to generate the second sequence of bits.

In Example 47, the subject matter of Example 46 can optionally include the hash function comprising at least one of: a message-digest algorithm, a cryptographic hash function, message-digest algorithm 5 (MD5), secure hash algorithm 1 (SHA1), or secure hash algorithm (SHA256).

In Example 48, the subject matter of any of Examples 40-47 can optionally include the query data is a hash of a file.

In Example 49, the subject matter of any of Examples 40-48 can optionally include a length of the sequence of query values being determined based on a threshold value.

In Example 50, the subject matter of any of Examples 41-49 can optionally include means for weighting the prevalence value based on the degree of confidence in the prevalence value.

In Example 51, the subject matter of any of Examples 40-50 can optionally include the prevalence value comprising at least one value corresponding to an order of magnitude.

In Example 52, the subject matter of any of Examples 41-51 can optionally include the degree of confidence comprising a probability calculated for the at least one value.

Example 53 is an apparatus for providing prevalence information based on a query, the apparatus comprising means for performing the method of any one of Examples 27-39.

In Example 54, the subject matter of Example 40 can optionally include the means for performing the method comprising at least one processors and at least one memory element.

In Example 55, the subject matter of Example 54 can optionally include the at least one memory element comprising machine readable instructions that when executed, cause the apparatus to perform the method of any one of Examples 27-39.

In Example 56, the subject matter of Examples 53-55 can optionally include the apparatus being a computing device.

Example 57 is at least one machine readable storage medium comprising instructions for providing prevalence information based on a query, wherein the instructions when executed implement a method or realize an apparatus as described in any one of Examples 27-39 or 53-56.

Example 58 is at least one machine readable medium including code, when executed, to cause a machine to perform the method of any one of Examples 27-39.

In Example 59, the subject matter of Example 40 can optionally include the apparatus is a computing device.

What is claimed is:

1. A machine readable non-transitory storage medium having instructions stored thereon for providing prevalence information based on a query, wherein the instructions when executed by at least one processors cause the at least one processors to perform the following operations:
   retrieving a sequence of target values from a data source;
   receiving query data from a communication device;
   generating a sequence of query values based on an identifier associated with the communication device;
   comparing each value in the sequence of query values and a corresponding value in the sequence of target values to identify a number of matching values, wherein the number of matching values counts the number of times the value is equal to the corresponding value;
   upon determining that the number of matching values exceeds a maximum number of matches stored in the data source, updating the maximum number of matches in the data source;
   calculating, using a statistical model, a prevalence value and a degree of confidence in the prevalence value based, at least in part, on the maximum number of matching values, the prevalence value being proportional to the number of matching values;
   weighting the prevalence value based on the degree of confidence in the prevalence value, and
   outputting to the communication device the prevalence value for the query data.

2. The machine readable non-transitory storage medium of claim 1, further comprising:
   receiving additional query data from the communication device, wherein the additional query data and the query data are the same; and
   in response to the receiving the additional query data, maintaining the maximum number of matches in the data source by not updating the maximum number of matches in the data source.

3. The machine readable non-transitory storage medium of claim 1, wherein the comparing comprises a pairwise comparing of consecutive values in the sequence of query values and corresponding consecutive values in the sequence of target values beginning with the first value in each of the sequence of query values and the sequence of target values.

4. The machine readable non-transitory storage medium of claim 1, wherein retrieving the sequence of target values from the data source comprises:
receiving first query data from a first communication device;
generating a first sequence of bits based upon an identifier associated with the first communication device; and
storing the first sequence of bits in the data source as the sequence of target values.

5. The machine readable non-transitory storage medium of claim 4, wherein the receiving the query data from the communication device comprises receiving second query data from a second communication device, and wherein generating the sequence of query values based on an identifier associated with the communication device comprises generating a second sequence of bits based upon an identifier associated with the second communication device.

6. The machine readable non-transitory storage medium of claim 5, wherein the generating a first sequence of bits comprises applying a hash function to the identifier associated with the first communication device to generate the first sequence of bits; and wherein generating the second sequence of bits comprises applying the hash function to the identifier associated with the second communication device to generate the second sequence of bits.

7. The machine readable non-transitory storage medium of claim 6, wherein the hash function comprises at least one of: a message-digest algorithm, a cryptographic hash function, message-digest algorithm 5 (MD5), secure hash algorithm 1 (SHA1), or secure hash algorithm (SHA256).

8. The machine readable non-transitory storage medium of claim 1, wherein the query data is a hash of a file.

9. The machine readable non-transitory storage medium of claim 1, wherein a length of the sequence of query values is determined based on a threshold value.

10. The machine readable non-transitory storage medium of claim 1, wherein the prevalence value comprises at least one value corresponding to an order of magnitude.

11. The machine readable non-transitory storage medium of claim 1, wherein the degree of confidence comprises a probability calculated for the at least one value.

12. An apparatus for providing prevalence information based on a query, the apparatus comprising:
at least one memory element;
at least one processor coupled to the at least one memory element;
a reputation information server coupled to the at least one processor, wherein the reputation information server is configured to:
retrieve a sequence of target values from a data source;
receive query data from a communication device;
generate a sequence of query values based on an identifier associated with the communication device;
compare each value in the sequence of query values and a corresponding value in the sequence of target values to identify a number of matching values, wherein the number of matching values counts the number of times the value is equal to the corresponding value;
upon determining that the number of matching values exceeds a maximum number of matches stored in the data source, update the maximum number of matches in the data source;
calculate, using a statistical model, a prevalence value and a degree of confidence in the prevalence value based, at least in part, on the maximum number of matching values, the prevalence value being proportional to the number of matching values;
weight the prevalence value based on the degree of confidence in the prevalence value, and
output to the communication device the prevalence value for the query data.

13. The apparatus of claim 12, wherein the reputation information server is further configured to:
receive additional query data from the communication device, wherein the additional query data and the query data are the same; and
in response to the receiving the additional query data, maintain the maximum number of matches in the data source by not updating the maximum number of matches in the data source.

14. The apparatus of claim 12, wherein retrieving the sequence of target values from the data source comprises:
receiving first query data from a first communication device;
generating a first sequence of bits based upon an identifier associated with the first communication device; and
storing the first sequence of bits in the data source as the sequence of target values.

15. The apparatus of claim 14, wherein the receiving the query data from the communication device comprises receiving second query data from a second communication device, and wherein generating the sequence of query values based on an identifier associated with the communication device comprises generating a second sequence of bits based upon an identifier associated with the second communication device.

16. A method for providing prevalence information based on a query, the method comprising:
retrieving a sequence of target values from a data source;
receiving query data from a communication device;
generating a sequence of query values based on an identifier associated with the communication device;
comparing each value in the sequence of query values and a corresponding value in the sequence of target values to identify a number of matching values, wherein the number of matching values counts the number of times the value is equal to the corresponding value; and
upon determining that the number of matching values exceeds a maximum number of matches stored in the data source, updating the maximum number of matches in the data source;
calculating, using a statistical model, a prevalence value and a degree of confidence in the prevalence value based, at least in part, on the maximum number of matching values, the prevalence value being proportional to the number of matching values;
weighting the prevalence value based on the degree of confidence in the prevalence value, and
outputting to the communication device the prevalence value for the query data.

* * * * *